United States Patent
Abbott, Jr.

(10) Patent No.: US 9,873,274 B2
(45) Date of Patent: Jan. 23, 2018

(54) ELECTROCALORIC HEATING AND COOLING DEVICE

(71) Applicant: HEWLETT-PACKARD DEVELOPMENT COMPANY, L.P., Houston, TX (US)

(72) Inventor: James Elmer Abbott, Jr., Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/306,855

(22) PCT Filed: Apr. 30, 2014

(86) PCT No.: PCT/US2014/036160
§ 371 (c)(1),
(2) Date: Oct. 26, 2016

(87) PCT Pub. No.: WO2015/167529
PCT Pub. Date: Nov. 5, 2015

(65) Prior Publication Data
US 2017/0043600 A1    Feb. 16, 2017

(51) Int. Cl.
*B41J 29/377* (2006.01)
*F25B 21/00* (2006.01)
*B41J 2/14* (2006.01)

(52) U.S. Cl.
CPC ......... *B41J 29/377* (2013.01); *B41J 2/14016* (2013.01); *F25B 21/00* (2013.01); *F25B 2321/001* (2013.01); *Y02B 30/66* (2013.01)

(58) Field of Classification Search
CPC ...... B41J 29/377; B41J 2/14016; F25B 21/00; F25B 2321/001; H01L 37/025; H01L 27/16; H01L 23/373; H01L 23/3677
See application file for complete search history.

(56) References Cited

U.S. PATENT DOCUMENTS 6,848,772 B2    2/2005    Kim
6,974,208 B2    12/2005   Park et al.
(Continued)

FOREIGN PATENT DOCUMENTS

WO    WO2014021850    2/2014

OTHER PUBLICATIONS

Chid et al., Characteristics of Heater Film for Ink-jet Printhead: Jun. 18, 1998, SPIE Digital Library, vol. 3422.

*Primary Examiner* — Juanita D Jackson
(74) *Attorney, Agent, or Firm* — Thorpe, North & Western L.L.P.

(57) ABSTRACT

The present disclosure is drawn to electrocaloric heating and cooling devices and related methods. The electrocaloric heating and cooling devices can comprise an electronic feature of an integrated circuit, wherein the electronic feature is for heating and cooling cycles. The device can also include an electrocaloric film in thermal communication with the electronic feature which includes a blend or solid solution of two or more components selected from the group consisting of BNT, BKT, BZT, BMgT, and BNiT. Electrodes can be associated with the electrocaloric film, and an electrical source can be to add or reduce electrical field between the electrodes across the electrocaloric film to influence both heating and cooling of the electronic feature.

19 Claims, 1 Drawing Sheet

(56) References Cited

U.S. PATENT DOCUMENTS

| | | |
|---|---|---|
| 7,780,270 B2 | 8/2010 | Lee et al. |
| 8,174,245 B2 | 5/2012 | Carver |
| 2003/0001131 A1* | 1/2003 | Takase ................ H01L 41/1878 252/62.9 R |
| 2004/0066250 A1 | 4/2004 | Hunt et al. |
| 2004/0070649 A1* | 4/2004 | Hess .................... B41J 2/14129 347/63 |
| 2009/0135219 A1 | 5/2009 | Nathan et al. |
| 2011/0221829 A1* | 9/2011 | Wang .................. B41J 2/14233 347/68 |
| 2012/0187325 A1 | 7/2012 | Hoffmann et al. |
| 2013/0161556 A1 | 6/2013 | Jeon et al. |

* cited by examiner

ELECTROCALORIC HEATING AND COOLING DEVICE

BACKGROUND

There are many methods used to cool microchips and other similar devices, including mechanical cooling using airflow, heat dissipation fins, and the like. However, with thin film stacks, layers that generate heat may not exposed to a surface, and thus, it can be more difficult to control the temperature profile. For example, removing heat from the thermal inkjet firing system between pulses tends to be a limiter of print speed as well as a limiter of the types of inks that can be commercially feasible for firing from a thermal inkjet device. In a thermal inkjet printing device, there is typically a resistor that is used to generate a thermal bubble, and the thermal bubble is used effectively to eject minute droplets of ink from a printing orifice. Thus, the resistor can be more effective if it can be heated and cooled rapidly. Unfortunately, this can be a difficult task as the resistor is typically buried in the thin film stack and is therefore, not easily cooled.

DETAILED DESCRIPTION

Figure 1:
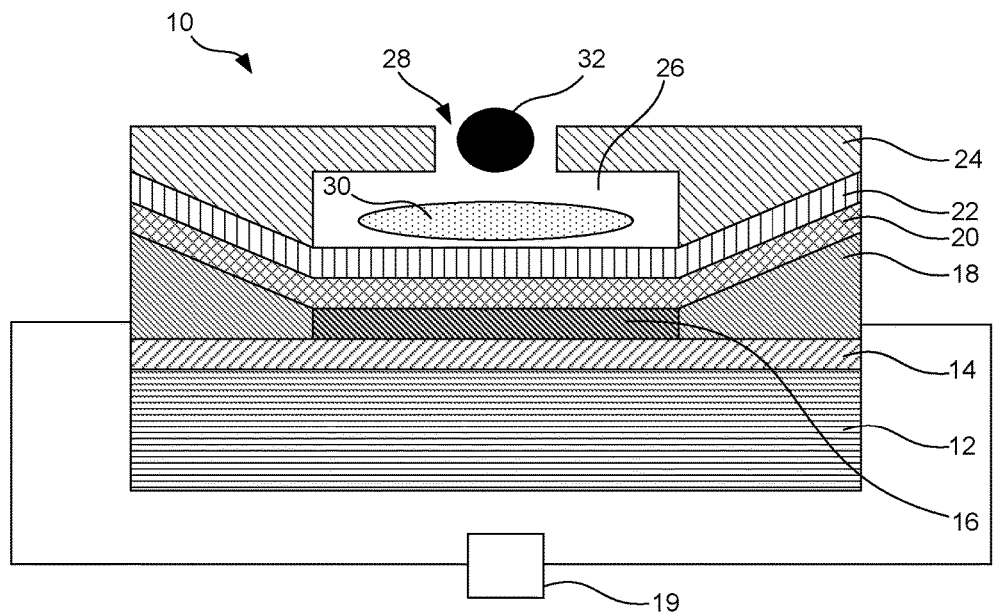
FIG. 1 is a schematic representation of a portion of a thermal inkjet printhead that includes an electrocaloric bismuth perovskite material positioned adjacent to, and beneath, a resistor element in accordance with an example of the present disclosure.

Electrocaloric materials, or materials that exhibit an electrocaloric effect, include materials that have reversible thermal properties, e.g., heating and/or cooling, under an electric field. Some of these types of materials can be formed as thin films, and furthermore, can act as a passivation layer. As a result, certain materials that have both of these properties can be applied as films in thermal communication with a thermal resistor or other electronic feature that undergoes heating and cooling cycles. In the case of a thermal inkjet resistor specifically, these materials can be used to provide enhanced firing frequency cycling by assisting in providing more rapid heating and/or cooling cycles. Such a design including an electrocaloric layer can both aid in accelerating cooling after a resistor firing pulse is over, and in some cases, can even assist in heating during firing of the thermal inkjet device. In other words, by being in thermal communication with the resistor, these heating and cooling properties can both add heat to the resistor (heating it faster) and draw heat away from the resistor (cooling it faster). This heating and cooling synergy can help increase the rate of firing and enable a greater inkjet ink space available for use and/or provide an increased speed profile for thermal inkjet ink devices generally. In the case of other integrated circuits which use resistors, heaters, or other electronic features that can be heated and cooled cyclically, the designs described herein can also provide benefit to the heating and cooling cycles of these devices. When referring to "thermal communication" or "thermal contact," this includes both actual physical contact as well as close enough in proximity to impact thermal heat transfer between two specific structures.

Certain bismuth-containing perovskite materials can be prepared and applied as one or more passivation layer(s) in a thin film stack, and these materials can also have the added benefit of providing electrocaloric properties. These "electrocaloric bismuth perovskite material(s)" can be highly suitable for these purposes and can be formed by mixing or blending various combinations of $Bi_{0.5}Na_{0.5}TiO_3$ (BNT), $Bi_{0.5}K_{0.5}TiO_3$ (BKT), $BiZn_{0.5}Ti_{0.5}O_3$ (BZT), $BiMg_{0.5}Ti_{0.5}O_3$ (BMgT), and $BiNi_{0.5}Ti_{0.5}O_3$ (BNiT). Specifically, these types of materials when blended together (two, three, four, or five) can form a film that exhibits the electrocaloric properties described herein. These materials can also be used as a passivation layer between an electronic feature, e.g., resistor, and one or more other layers, providing the dual function of providing electrical spacing between conductive materials, and assisting in solid state cooling of layers.

These bismuth-containing perovskite materials possess a number of possible structural distortions that are very close in energy. One consequence of this is that the structures are highly compliant and are thus highly responsive to external stimuli (and hence produce large field-induced strains). Second, some of these compositions can undergo an electric field-induced phase transformation (e.g. from a cubic phase to a tetragonal phase). A large change in volume (and polarization) may accompany this phase transition. Furthermore, when a first electric field is applied to these materials, they can exhibit cooling properties, and when a second electric field is applied, they can exhibit heating properties (or when the electric field is stopped, the cooling effect may begin or stop, depending on the material and potentials used). For each specific material blend or solid solution, heating and cooling electric fields can be determined experimentally by one skilled in the art. These heating and cooling electric fields can be selected so that they work well with electronic feature heating and/or cooling, e.g., heating and/or cooling of an inkjet firing resistor, microfluidic pump, heater circuit, etc.

In accordance with this, the present disclosure is drawn to an electrocaloric device, a thermal inkjet printhead, a method of making a thermal inkjet printhead, and a method of cycling heating and cooling profiles of an integrated circuit.

More specifically, an electrocaloric device can include an electronic feature of an integrated circuit, wherein the electronic feature is for heating and cooling cycles. The device can also include an electrocaloric film in thermal communication with the electronic feature, and can include a blend or solid solution of two or more components selected from the group consisting of BNT, BKT, BZT, BMgT, and BNiT. Electrodes can be associated with the electrocaloric film, and an electrical source can be to add or reduce electrical field between the electrodes and across the electrocaloric film to influence both heating and cooling of the electronic feature. In one example, the electronic feature can be a resistor, and the resistor is for movement of fluid by heating and cooling the resistor. For example, the resistor can be for fluid jetting from an inkjet printhead, for movement of fluid through fluid microchannels, for fluid movement used to actuate structures in a MEMS device, for fluid movement in inertial pumps that pump fluid based on vapor bubble formation, etc. Alternatively, the electronic feature can be a heating element that is used for any of a number of purposes, including assisting with chemical reaction processes that utilize both heating and cooling at the same location, but at different points in time, e.g., polymerase chain reaction to create copies of DNA fragments.

In another example, an electrocaloric thermal inkjet printhead can comprise a substrate; a first passivation layer applied to the substrate; a resistor element applied to the first passivation layer; a second passivation layer applied to the thermal inkjet resistor element; and a cavitation layer applied to the second passivation layer. In this example, one or both of the first passivation layer or the second passivation layer comprises an electrocaloric bismuth perovskite material. It is noted that there can be intervening layers between any of these layers described, as long as those layers do not prevent the function for which the layer is intended. For example, a conductive layer(s) may be added on top of or beneath the resistor layer to prevent migration of ion species between layers into the resistor material. Thus the term "applied to" does not preclude the presence of intervening layers. However, it is also noted that with each layer, it is understood that a layer can likewise be "applied directly to" another substrate, which would indicate that there is no intervening layer at a given location.

In another example, a method of making the electrocaloric thermal inkjet printhead described herein can comprise steps of configuring the resistor element to act as a charged electrode; positioning one or both of the passivation layers comprising the electrocaloric bismuth perovskite material in thermal communication with a resistor element; and positioning a grounded electrode layer with respect to the passivation layer and the resistor element such that the passivation layer is electrocalorically active when an electrical potential is generated between the resistor element and the grounded electrode layer.

In another example, a method of temperature cycling an electronic feature of an integrated circuit can comprise applying an electrical potential across an electrocaloric bismuth perovskite material that is thermally coupled with a electronic feature; and allowing the electrocaloric bismuth perovskite material to increase in temperature in a manner approaching a temperature of the electronic feature, e.g., until within ±100° C., within ±20° C., within ±5° C., or within ±2° C. of the electronic feature in various examples. Thus, the term "approaching" includes even surpassing, as long as it starts out below the temperature of the electronic feature. When ready for cooling, a step of reducing the electrical potential can be carried out, leading to a decrease in temperature of the electrocaloric material, which in turn draws heat away from the resistor element and into the electrocaloric bismuth perovskite material.

With these examples in mind, it is noted that in each of the various embodiments described herein, whether discussing the electrocaloric bismuth perovskite material, electrocaloric devices in general, electrocaloric inkjet printheads, or related methods, there may be some common features that further characterize options in accordance with principles discussed herein. Thus, any discussion of the materials, devices, or methods, either alone or in combination, is also applicable to the other embodiment not specifically mentioned. For example, a discussion of the electrocaloric properties in the context of the printhead is also applicable to the methods, and vice versa.

Figure 2:
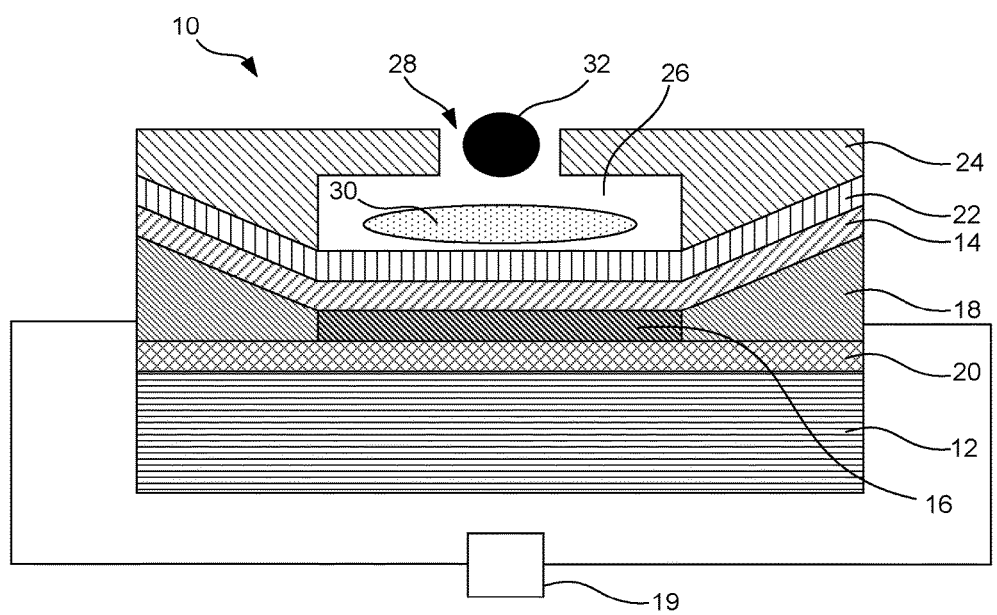
FIG. 2 is a schematic representation of a portion of a thermal inkjet printhead that includes an electrocaloric bismuth perovskite material positioned adjacent to, and above, a resistor element in accordance with another example of the present disclosure.

Turning now to the FIGS., FIGS. 1 and 2 depict example electrocaloric devices. In these specific examples, the electrocaloric devices are thermal inkjet printheads. However, other electrocaloric devices can likewise be prepared in accordance with principles of the present disclosure, as would be appreciated by one skilled in the art after considering the present disclosure, e.g., fluid pumps, heaters, MEMS devices, etc. Though the disclosure herein discusses thermal inkjet printhead technology and resistors at length, it is understood that other types of integrated circuit devices and electronic features can be used, without limitation. Thermal inkjet printing technology is merely provided to exemplify principles of the present disclosure and thus, should not be considered particularly limiting. Additionally, it is noted that in addition to the thin film layers described in the FIGS., other intervening layers may likewise be used at various locations for other purposes known in the art, e.g., prevent ion migration, provide improved electrical properties, etc., and such additional layers would not change the basic relationship shown in the FIGS, unless the context explicitly states otherwise.

Specifically, with reference to FIG. 1, a portion of a thermal inkjet printhead 10 is shown which includes a silicon substrate or wafer 12 having a first passivation layer 14 applied thereto (applied directly as shown or indirectly through another layer not shown). Any insulating or partially insulating material that is suitable for use in a thermal inkjet printhead stack can be used. For example, the electrical insulating passivation layer can be formed by thermal oxidation of the silicon substrate (or any other structure where a passivation layer is desirable such as the resistor 16 or conductors 18), or by the affirmative deposition of an electrically insulating thin film. Insulating materials that can be used can be $SiO_2$, SiN, $Al_2O_3$, $HfO_2$, $ZrO_2$, or undoped silicate glass, for example. In this example, the first passivation layer can be from 0.02 micron to 1 micron in thickness, though thicknesses outside of this range can also be suitable.

To the passivation layer 14 is applied (directly or indirectly) a resistor 16, which can be prepared using any known resistor material known in the thermal inkjet printing arts, such as TaAl, WSiN, TaSiN, or $Ta_2O_5$. A suitable average thickness for the resistor can be from 0.02 microns to 0.5 microns, though thicknesses outside of this range can also be used. Furthermore, the resistor, as described, can be doped with any material suitable for achieving desired electrical properties, including, but not limited to, resistivity.

The resistor 16 is likewise in electrical communication with a pair of conductors 18 positioned on either side of the resistor. These conductors can act as electrodes for the resistor. The electrodes can be associated with an electrical source 19. In this example, the conductors are also applied to the insulating layer, though this arrangement is merely exemplary. The conductors can be of any material known in the art, but in one example, the conductors can be aluminum, or an alloy of aluminum and copper. A suitable average thickness for the conductors can range from an average thickness of 0.1 micron to 2 microns, though this range is not intended to be limiting.

A second passivation layer 20, which in this example is an electrocaloric bismuth perovskite material, can be applied to the resistor 16 (directly or indirectly) and the conductors 18. This layer can act as both a thermally active material for heating and/or cooling the resistor, as well as an insulator or passivation layer between the resistor 16 and a subsequently applied metallic cavitation layer 22. The second passivation layer can be from 0.02 micron to 1 micron in thickness, though thicknesses outside of this range can also be suitable.

The cavitation layer 22 can be applied directly or indirectly to the second passivation layer 20. The thin metallic cavitation layer 22 can be amorphous or more crystalline. Example metallic materials that can be used include tantalum which has a crystalline structure, or alternatively, more amorphous metal and metalloid blends (e.g., blends of metalloids such as carbon, silicon, boron, titanium, vanadium, chromium, cobalt, nickel, zirconium, niobium, molybdenum, rhodium, palladium, hafnium, tantalum, tungsten, iridium, and/or platinum). Other cavitations materials known in the art can likewise be used in a similar manner.

The cavitation layer 22 can be deposited by sputtering, atomic layer deposition, chemical vapor deposition, electron beam evaporation, or thermal evaporation. Sputter deposition conditions that can be used can depend on variables such as target size, electrical power used, pressure, sputter gas, target to substrate spacing and a variety of other deposition system dependent variables. The cavitation layer can likewise be doped, such as with oxygen and/or nitrogen. Generally, the metallic cavitation layer can have a thickness ranging from 10 angstroms to 100 microns. In one example, the thickness can be from 10 angstroms to 2 microns. In one aspect, the thickness can be from 0.05 microns to 0.5 microns.

Also shown is a polymeric structure 24 which encloses the firing chamber 26 by providing side walls and a top portion, leaving a jetting orifice 28 in place for ejection of an inkjet ink 32 from the firing chamber via a drive bubble 30.

In the example shown in FIG. 1, in addition to the standard resistor element electrodes 18, the electrocaloric material also has a pair of "electrodes" that are provided by other structures. For example, the ground "electrode" can be the cavitation layer 22, which is positioned above the electrocaloric bismuth perovskite second passivation layer 20. Furthermore, in this example, the resistor element 16 acts as the charged electrode for the second passivation (electrocaloric) layer. Thus, a synergy between the thermal inkjet firing event and induced electrocaloric effect can be leveraged together. As an example, a high field or potential is applied during the firing pulse. This firing pulse both causes heating of the resistor and heating of the electrocaloric material by inducing an ordering of the crystal structure of the electrocaloric material, which in turn, reinforces the heating event. When the firing pulse is over, the electrocaloric material rapidly cools relative as the material disorders, thus, aiding in rapidly pulling heat out of the resistor.

Referring now to FIG. 2, it is noted that this structure is the same as that shown and described in FIG. 1, with the exception that the first passivation layer 14 is applied above the resistor 16 and conductors 18, and the second passivation layer 20 (which is also the electrocaloric bismuth perovskite material) is applied beneath the resistor and conductors. All other structures and reference numerals are the same, and are incorporated herein by reference. In the example shown in FIG. 2, in addition to the standard resistor element electrodes 18, the electrocaloric material also has a pair of "electrodes" that are provided by other structures. For example, the ground "electrode" can be the silicon substrate 12 (typically doped to provide conductivity), which is positioned below the second passivation layer 20, which in this case is the electrocaloric bismuth perovskite material. One general operating process may include applying a high field or potential during the firing pulse. This firing pulse both causes heating of the resistor and heating of the electrocaloric material by inducing an ordering of the crystal structure of the electrocaloric material, which in turn, reinforces the heating event. When the firing pulse is over, the electrocaloric material rapidly cools relative as the material disorders, thus, aiding in rapidly pulling heat out of the resistor area. In this example, the cooling pumps or directs the heat down into the substrate.

In another example, both passivation layers can be comprised of the electrocaloric bismuth perovskite material, though this example is not specifically shown in the FIGS.

For further clarity, it is noted that the charged and grounded "electrodes" described with respect to the electrocaloric bismuth perovskite material should not be confused with the electrodes 18 shown in FIGS. 1 and 2. The electrodes shown in FIGS. 1 and 2 are electrodes that are used for providing electrical potential to the resistor for firing. Conversely, the "electrodes" described for use with the electrocaloric material can be provided by the resistor, silicon substrate, cavitation layer, etc. It is true, however, that in one example, the electrodes shown in FIGS. 1 and 2 can provide electrical potential to the resistor for firing can in turn provide electrical potential through the resistor so that the resistor acts as an electrode for the electrocaloric material. This is one possible arrangement.

The thermal inkjet thin film stack (or other integrated circuit device) can be relatively thin to relatively thick, e.g., from 50 angstroms to 2500 angstroms, from 50 angstroms to 1000 angstroms, from 100 angstroms to 1000 angstroms, from 100 angstroms to 500 angstroms, from 100 angstroms to 200 angstroms, etc. These thickness are not intended to be limiting. The polymeric structure 24 can vary from about 10 microns to 40 microns in common devices, and the silicon wafer or substrate 12 can range from about 100 microns to about 1000 microns, for example.

Generally, bismuth perovskite materials prepared in accordance with the disclosed technology can include a variety of combinations of BNT, BKT, BZT, BMgT, and BNiT. As used herein, the names of these components (BNT, BKT, BZT, BMgT, and BNiT) are used to refer to both the pure, stoichiometrically perfect materials, as well as materials with a small degree of non-stoichiometry or doping included. However, since the materials used are typically not only for the electrocaloric properties, but also as a passivation or insulating layer, the materials typically are not modified to the extent that the start to become too semiconducting. The typical material will be prepared that is both electrocaloric as well as insulating to provide a capacitive space between a grounded electrode (e.g., silicon substrate or cavitation layer) and a charged electrode (e.g., resistor element).

As mentioned, in some examples, an electrocaloric bismuth perovskite material can include two of the perovskite compounds selected from BNT, BKT, BZT, BMgT, and BNiT. In one such example, the electrocaloric material can be BNT-BMgT. Other examples include BKT-BMgT, BKT-BNT, BKT-BZT, BNiT-BNT, or BNiT-BKT. In some examples, the electrocaloric material can have one of the following general chemical formulas, though others can certainly be paired together:

$$x\text{BNiT-}y\text{BKT},$$

$$x\text{BNiT-}y\text{BNT},$$

$$x\text{BMgT-}y\text{BKT},$$

$$x\text{BMgT-}y\text{BNT},$$

$$x\text{BZT-}y\text{BNT},$$

or $$x\text{BZT-}y\text{BKT}$$

wherein $x+y=1$ and $x \leq 0.25$ (based on solubility limits).

Some, but not all, of the above binary compositions have stable perovskite structures. Many compositions with stable perovskite structures can be found according to the above chemical formulas when $0<x<0.25$, where x corresponds to the mole fraction of BZT, BMgT, or BNiT. Thus, many compositions with stable perovskite structures can be found according to these chemical formulas when $0<x<0.25$. In one specific example, the electrocaloric material can be 80BNT-20BMgT, which has the chemical formula (0.8)BNT-(0.2)BMgT. In another specific example, the electrocaloric material can be 10BZT-90BKT, which has the chemical formula (0.1)BZT-(0.9)BKT. In another specific example, the electrocaloric material can be 2.5BZT-97.5BNT, which has the chemical formula (0.025)BZT-(0.975)BNT. As can be seen from these formulas, BNiT, BZT, or BMgT are usually present at 25 mol %, though this is not required. These are merely examples to illustrate the nomenclature for these types of materials.

In still further examples, an electrocaloric bismuth perovskite material can include three of the perovskite compounds selected from BNT, BKT, BZT, BMgT, and BNiT. Several possible ternary compositions include BZT-BKT-BNT, BNiT-BKT-BNT, and BMgT-BKT-BNT.

In one such example, an electrocaloric material can have the general chemical formula xBZT-yBKT-zBNT, wherein $x+y+z=1$ and x, y, $z\neq 0$. Other ternary blends can have the same or similar arrangement where $x+y+z=1$ and x, y, $z\neq 0$. Many compositions according to the above general chemical formula can have stable perovskite structures when $0<x<0.25$, $0.01<y<0.99$, and $0.01<z<0.99$. In other examples, the electrocaloric material can have the above general chemical formula wherein $0<x<0.10$, $0.01<y<0.99$, and $0.01<z<0.99$. In yet other examples, the electrocaloric material can have the above general chemical formula wherein $0<x<0.19$, $y=0.28-0.50$ and $z=0.40-0.65$. Compositions in this range can have especially high maximum electromechanical strain coefficients ($d_{33}$), as discussed further below. In still more examples, the electrocaloric material can have any composition according to the above general chemical formula except for compositions where $0.01<x<0.25$, $0.01<y<0.99$ and $0.01<z<0.99$.

Other ternary compositions can be obtained according to the general chemical formula xBNiT-yBKT-zBNT, wherein $x+y+z=1$, and x, y, $z\neq 0$. Many compositions according to this chemical formula can have stable perovskite structures when $0.01<x<0.25$. Additional ternary compositions can be obtained by the general chemical formula xBMgT-yBKT-zBNT, wherein $x+y+z=1$, and x, y, $z\neq 0$. Many compositions according to this chemical formula can have stable perovskite structures when $0.01<x<0.25$.

Again, these ternary compounds are merely exemplary, as various combinations of three components can be effectively prepared.

Beyond ternary compositions, electrocaloric materials can also include combinations of four of the perovskite compounds selected from BNT, BKT, BZT, BMgT, and BNiT. All five of these compounds can also be combined. Furthermore, the electrocaloric materials are not limited to containing only these perovskite compounds. Rather, the electrocaloric materials can contain other components as well.

The electrocaloric ceramic materials can be made by any suitable solid-state synthesis method, using starting powders such as $Bi_2O_3$, $NaCO_3$, $KCO_3$, ZnO, and $TlO_2$. The relative amounts of BNT, BKT, BZT, BMgT, and BNiT may be adjusted so that the product will exhibit a structural transition (that is related to change in temperature) that is appropriate for a specific application. By adjusting relative amounts of the ingredients above, a structural transition temperature can be achieved that is useful heating and/or cooling a specific resistor element (or other electronic feature) within a desired temperature profile using electrical potential, or for providing additional heating or cooling assistance for the resistor, e.g., for jetting inks, fluid movement, etc., that may not normally be particularly usable with a specific resistor material. In further detail, the term "structural transition" refers to a change in the structure of the material leading to a change in polarization of under different electric field and temperature conditions. When exposed to an electric field at an appropriate temperature, the structural transition leads to a decrease in entropy of the crystal structure resulting in an increase in temperature of the material. When the electric field is relaxed, the entropy of the system is allowed to increase again leading resulting in a temperature decrease. A suitable structural transition temperature for an electrocaloric material as described herein can range from 50° C. to 300° C., or from 80° C. to 200° C., for example. The electrical potential that is used to achieve this structural transition can vary by materials and temperature, but may typically have a magnitude in the range of 0 to 100 kV/cm. The structural transition can further be characterized as it relates to a change in time varying atomic displacements in a disordered relax or ferroelectric material. A first state may represents a state which is characterized by a stable polar phase (non-ergodic state). The second state may be characterized by a non-polar phase (ergodic state). The relative stability of the multiple states can be a function of temperature and of composition. In addition, under the application of an electric field of sufficient magnitude, the second state can transition into the first state, for example.

In accordance with conventional solid state synthesis methods for making ceramic materials, the powders can be milled, shaped, and calcined to produce the desired ceramic product. Milling can be either wet or dry type milling, as is known in the art. High energy vibratory milling may be used, for instance, to mix starting powders and for post-calcination grinding. The powders can be mixed with a suitable liquid, e.g., ethanol or water, or a combination of liquids, and wet milled with a suitable high density milling media, e.g., yttria stabilized zirconia (YSZ) beads. The milled powders can be calcined, then mixed with a binder, formed into the desired shape, e.g., pellets, and sintered to produce a ceramic product with high sintered density.

Binary (i.e. having two members) or ternary (i.e. having three members) compositions, or even blends of four or five members, can be produced via solid-state synthesis methods using the appropriate amounts of ZnO, NiO, MgO, (or $MgCO_3$) $Bi_2O_3$, $TiO_2$, $NaCO_3$ and $KCO_3$ starting powders of usually at least 99% purity. Appropriate amounts of those powders can be combined to yield the final binary composition as described above (xBZT-yBNT, xBMgT-yBNT, xBNiT-yBNT, xBZT-yBKT, xBMgT-yBKT, or xBNiT-yBKT, wherein $x+y=1$). Alternatively, appropriate amounts of the starting powders can combined to yield the final ternary compositions with the general chemical formulas as also described above (e.g., xBZT-yBKT-zBNT, xBMgT-yBKT-zBNT, or xBNiT-yBKT-zBNT, wherein $x+y+z=1$). These are merely a few examples, and others can be prepared as well.

When the intended use of the binary or ternary ceramic material utilizes a thin film product, the production method can be modified to include chemical solution deposition using chemical precursors such bismuth nitrate, titanium isopropoxide, etc., or sputtering using solid state sintered or hot-pressed ceramic targets. Any suitable sputtering or chemical deposition method can be used for this purpose. The resulting thin film ceramic can have a thickness in the range of about 50 nm to about 10 µm, in some cases.

It is noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 at % to about 5 at %" should be interpreted to include not only the explicitly recited values of about 1 at % to about 5 at %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

Example 1—Thermal Inkjet Thin Film Stack 1

Silicon dioxide is deposited onto a silicon wafer via PECVD thin film deposition at a thickness ranging from 50 nm to 2000 nm. Next, a resistor material is deposited via sputter deposition and then patterned with photolithography and dry etch to form a thermal inkjet resistor element. The thickness of the resistor element may be from about 30 nm to 150 nm range. In one example, a conductive layer may be added on top of the resistor layer to prevent migration of ion species from electrocaloric material into the resistor material. In another example, there may be no intervening layer and the electrocaloric bismuth perovskite material layer is deposited via solution deposition in a series of layers directly to the resistor element. Either approach may be suitable. A drying step may occur at each layer at ~300° C. for 1-5 minutes. After drying, each layer is sintered at ~650° C. to 750° C. for 5-15 minutes to establish the final crystallization of the material. With this arrangement, this layer can act as both an interlayer dielectric as well as an electrocaloric film. The thickness of the electrocaloric layer can be from about 50 nm to 300 nm in some examples. Next, a tantalum (Ta) cavitation layer applied via PVD at a thickness from about 100 nm to 1000 nm. In this example, the tantalum electrode can act as a ground electrode to the charged electrode provided by the resistor.

Example 2—Thermal Inkjet Thin Film Stack 2

A doped silicon substrate is doped with $7.5 \times 10^{14}$ atoms per $cm^3$ of Boron so that it is suitable for use as a grounded electrode for the cooling system. In one example, a conductive layer may be added to the substrate to prevent migration of species from the electrocaloric material into the silicon, and in another example, no intervening layer is used. Next, an electrical isolation (passivation) and electrocaloric layer of bismuth perovskite material is applied to the doped substrate (or intervening conductive layer) via solution deposition in a series of layers. A drying step occurs at each layer at ~300° C. for 1-5 minutes. After drying each layer is sintered at ~650° C. to 750° C. for 5-15 minutes to establish the final crystallization of the material. In this example, this layer acts as both the interlayer dielectric and the electrocaloric film. Common thicknesses that can be used for this layer can be from about 50 nm to 300 nm. The resistor element is then deposited via sputter deposition and patterned with photolithography and dry etch. Common thicknesses for the resistor element can be from about 30 nm to 150 nm. In one example, a conductive layer may be added below the resistor layer to prevent migration of species in the electrocaloric material into the resistor material, and in another example, no intervening layer is used. A second dielectric (passivation) layer can then be deposited at ~400° C. at from about 100 nm to 600 nm in thickness. Combinations of films such as SiN and SiC can be used in this layer. However, that being stated, though this upper passivation layer might function only as passivation layer between the resistor element and cavitation layer, in one example, it can also be the same or a different electrocaloric material as previously applied. In such an example, there can be two solid state cooling layers (one above and one below the resistor). In either case, to this upper passivation layer is applied a tantalum layer that is deposited via PVD. Common thicknesses that can be used range from about 100 nm to 1000 nm.

While the disclosure has been described with reference to certain examples, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. An electrocaloric heating and cooling device, comprising:
   an electronic feature of an integrated circuit, wherein the electronic feature is for heating and cooling cycles;
   an electrocaloric film in thermal communication with the electronic feature, the electrocaloric film comprising a blend or solid solution of two or more components selected from the group consisting of $Bi_{0.5}Na_{0.5}TiO_3$ (BNT), $Bi_{0.5}K_{0.5}TiO_3$ (BKT), $BiZn_{0.5}Ti_{0.5}O_3$ (BZT), $BiMg_{0.5}Ti_{0.5}O_3$ (BMgT), and $BiNi_{0.5}Ti_{0.5}O_3$ (BNiT);
   electrodes associated with the electrocaloric film; and
   an electrical source to add or reduce electrical field between the electrodes across the electrocaloric film to influence both heating and cooling of the electronic feature.

2. The electrocaloric heating and cooling device of claim 1, wherein the electronic feature is a resistor, and the resistor is for movement of fluid by heating and cooling the resistor.

3. The electrocaloric heating and cooling device of claim 1, wherein the electronic feature is a heating element.

4. An electrocaloric thermal inkjet printhead, comprising:
   a substrate;
   a first passivation layer applied to the substrate;
   a resistor element applied to the first passivation layer;
   a second passivation layer applied to the thermal inkjet resistor element; and a cavitation layer applied to the second passivation layer, wherein one or both of the first passivation layer or the second passivation layer comprises an electrocaloric bismuth perovskite material.

5. The electrocaloric thermal inkjet printhead of claim 4, wherein the electrocaloric bismuth perovskite material comprises two or more components selected from the group consisting of $Bi_{0.5}Na_{0.5}TiO_3$ (BNT), $Bi_{0.5}K_{0.5}TiO_3$ (BKT), $BiZn_{0.5}Ti_{0.5}O_3$ (BZT), $BiMg_{0.5}Ti_{0.5}O_3$ (BMgT), and $BiNi_{0.5}Ti_{0.5}O_3$ (BNiT).

6. The electrocaloric thermal inkjet printhead of claim 5, wherein the electrocaloric bismuth perovskite material has one of the following general chemical formulas:

$$xBiNi_{0.5}Ti_{0.5}O_3 \text{ (BNiT)-}yBi_{0.5}K_{0.5}TiO_3 \text{ (BKT)};$$

$$xBiNi_{0.5}Ti_{0.5}O_3 \text{ (BNiT)-}yBi_{0.5}Na_{0.5}TiO_3 \text{ (BNT)};$$

$$xBiMg_{0.5}Ti_{0.5}O_3 \text{ (BMgT)-}yBi_{0.5}K_{0.5}TiO_3 \text{ (BKT)};$$

$$xBiMg_{0.5}Ti_{0.5}O_3 \text{ (BMgT)-}yBi_{0.5}Na_{0.5}TiO_3 \text{ (BNT)};$$

$$xBiZn_{0.5}Ti_{0.5}O_3 \text{ (BZT)-}yBi_{0.5}Na_{0.5}TiO_3 \text{ (BNT)};$$

$$xBiZn_{0.5}Ti_{0.5}O_3 \text{ (BZT)-}yBi_{0.5}K_{0.5}TiO_3 \text{ (BKT)};$$

wherein $x+y=1$ and $x \leq 0.25$.

7. The electrocaloric thermal inkjet printhead of claim 5, wherein the electrocaloric bismuth perovskite material has the general chemical formula:

$$xBiZn_{0.5}Ti_{0.5}O_3 \text{ (BZT)-}yBi_{0.5}K_{0.5}TiO_3 \text{ (BKT)-}zBi_{0.5}Na_{0.5}TiO_3 \text{ (BNT)}$$

wherein $x+y+z=1$, $0<x<0.19$, $y=0.28$ to $0.50$, and $z=0.40$ to $0.65$.

8. The electrocaloric thermal inkjet printhead of claim 4, further comprising an intervening conductive layer positioned between the substrate and the first passivation layer, between the first passivation layer and the resistor element, and/or between the resistor element and the second passivation layer.

9. The electrocaloric thermal inkjet printhead of claim 4, wherein the electrocaloric bismuth perovskite material has a structural transition temperature at from 50° C. to 300° C.

10. The electrocaloric thermal inkjet printhead of claim 4, wherein the resistor element is energized using a pair of electrodes positioned on opposite sides of the resistor element.

11. The electrocaloric thermal inkjet printhead of claim 10, wherein the second passivation layer is applied above the resistor element and electrodes.

12. The electrocaloric thermal inkjet printhead of claim 4, wherein the first passivation layer comprises the electrocaloric bismuth perovskite material, and wherein the substrate is configured as a grounded electrode and the resistor element is configured as a charged electrode for the first passivation layer.

13. The electrocaloric thermal inkjet printhead of claim 4, wherein the second passivation layer comprises the electrocaloric bismuth perovskite material, and wherein the cavitation layer is configured as a grounded electrode and the resistor element is configured as a charged electrode for the first passivation layer.

14. A method of making the electrocaloric thermal inkjet printhead of claim 4, comprising:
configuring the resistor element to act as a charged electrode;
positioning the first passivation layer or the second passivation layer which comprises the electrocaloric bismuth perovskite material in thermal communication with a resistor element; and
positioning a grounded electrode with respect to the electrocaloric bismuth perovskite material such that the material is electrocalorically active when an electrical potential is generated between the resistor element and the grounded electrode.

15. The method of claim 14, wherein the grounded electrode is provided by the substrate or the cavitation layer.

16. The electrocaloric thermal inkjet printhead of claim 4, wherein the passivation layer comprising the electrocaloric bismuth perovskite material has a thickness from 50 nm to 300 nm.

17. A method of temperature cycling an electronic feature of an integrated circuit, comprising:
a) applying an electrical potential across an electrocaloric bismuth perovskite material that is thermally coupled with the electronic feature;
b) allowing the electrocaloric bismuth perovskite material to increase in temperature approaching a temperature of the electronic feature; and
c) releasing or reducing the electrical potential leading to a decrease in temperature of the electrocaloric material, which draws heat away from the electronic feature and into the electrocaloric bismuth perovskite material.

18. The method of claim 17, further comprising repeating steps a) to c) to assist in temperature cycling the electronic feature.

19. The method of claim 17, wherein the electronic feature is a resistor or a heating element.

* * * * *